United States Patent [19]

Grunke

[11] 4,199,339

[45] Apr. 22, 1980

[54] METHOD FOR THE MANUFACTURE OF A MOLDED MEMBER FROM A CERAMIC MATERIAL

[75] Inventor: Richard Grunke, Munich, Fed. Rep. of Germany

[73] Assignee: Motoren-und Turbinen-Union München GmbH, Munich, Fed. Rep. of Germany

[21] Appl. No.: 930,642

[22] Filed: Aug. 3, 1978

[30] Foreign Application Priority Data

Aug. 18, 1977 [DE] Fed. Rep. of Germany ....... 2737266

[51] Int. Cl.² ............................................. C03B 23/20
[52] U.S. Cl. ........................................ 65/18; 65/32; 65/60 C; 65/60 D; 427/350; 427/376.2; 427/383.3; 427/383.5
[58] Field of Search ................ 65/60 C, 60 D, 18, 32; 427/350, 383 A, 383 B, 376 A

[56] References Cited

U.S. PATENT DOCUMENTS

| 1,818,904 | 7/1927 | Martin ......................... 427/376 A X |
| 2,238,777 | 4/1941 | Lemmers et al. ....................... 65/60 |
| 2,663,658 | 12/1955 | Schurecht .................... 427/376 A X |
| 3,394,026 | 7/1968 | Parr et al. ..................... 427/376 A X |
| 3,971,645 | 7/1976 | Bachmann et al. ............. 65/60 D X |
| 4,017,291 | 4/1977 | Gliemeruth et al. ............ 65/60 C X |

OTHER PUBLICATIONS

Procedures in Experimental Physics—By Strong—pp. 168 to 175.

*Primary Examiner*—Robert L. Lindsay, Jr.
*Attorney, Agent, or Firm*—Scully, Scott, Murphy & Presser

[57] ABSTRACT

A method for the manufacturing of a molded member from a ceramic material, including compressing the molded member within an evacuated capsule of a high temperature-resistant glass under a pressure acting thereabout until the molded member attains a non-porous condition. The working materials for the glass capsule are applied to the molded member in a non-vitrified state; and the coated member is subjected to the reaction temperature of the materials under a vacuum until there is formed a cohesive glass layer enveloping the molded member which will constitute the capsule.

7 Claims, No Drawings

METHOD FOR THE MANUFACTURE OF A MOLDED MEMBER FROM A CERAMIC MATERIAL

BACKGROUND OF THE INVENTION

1. Field of the Invention

The present invention relates to a method for the manufacture of a molded member from a ceramic material, for instance of silicon nitride or silicon carbide, wherein the molded member, which is arranged in an evacuated capsule of a high temperature-resistant glass, is compressed into a non-porous condition under a pressure acting on all sides thereof. The starting material of the glass capsule is applied onto the molded members in a non-vitrified state and exposed under a vacuum to its reaction temperature until there is formed a molded member-encompassing, cohesive glass layer which constitutes the capsule. This method is generally and summarily designated as high-temperature isostatic pressing. The object of the method is to compress a ceramic member having a porosity of up to about 30% under a pressure uniformly acting thereon on all of its sides up to non-porosity in order to increase its strength.

2. Discussion of the Prior Art

A prerequisite for being able to increase the density of the ceramic member lies in the evacuation of its pores. The molded members are produced in the form of pressings or briquettes, which are surrounded by a capsule or envelope. At present, known are the following approaches to the manufacturing of such pressings:

1. Encapsulation of ceramic powder in glass molds.
2. Encasing of reaction-sintered molded members by dipping them into liquefied glass.

SUMMARY OF THE INVENTION

Accordingly, it is a primary object of the present invention to provide a simple, uncomplicated method for the high-temperature isostatic pressing of a molded ceramic member.

A more specific object of the present invention resides in manufacturing a molded ceramic member of the type described, preferably from silicon nitride or silicon carbide, in which a work material for a glass capsule is applied in a non-vitrified condition onto the molded member and subjected to its reaction temperature under a vacuum for so long until there is produced a cohesive molded member-encompassing glass layer which forms the glass capsule.

A particular aspect of the invention provides for a single-step method of producing a molded ceramic member of the above-described type which is particularly suited for mass production due to its being relatively inexpensive. Although subject to the limitation that the glass envelope does not evidence an ideal degree of homogeneity, inasmuch as the glass envelope is, as a rule, again removed after the compressing of the molded member, this limitation need only be considered when it would be disruptive of the maintenance of the vacuum interiorly of the pressing, which can be avoided by refinement of the method.

In another preferred aspect of the present invention, there is contemplated a two-step method of producing the molded ceramic member which provides the advantage of imparting an ideal homogeneous structure to the glass envelope although it is of a somewhat greater complexity than the above-mentioned single-step method of the invention.

In a further aspect of the present invention it is contemplated that the constituents of the enveloping or coating layer be constituted of oxides of the rare earths (or lanthanide series) and silicon oxide, and that the conversion temperature be about 1200° C., with the treatment period consisting of up to a few hours. Finally, the constituents of the coating layer may generally also be constituted of oxides of the elements of the first to fourth groups of the periodic system and of silicon oxide.

The coating of a molded ceramic member with glass is known per se, having reference to German Patent No. 25 10 938. However, in that instance, the glass coating is only for increasing the resistance to oxidation of the ceramic component. The glass layer prevents the entry of air into the pores of the molded ceramic member beneath the glass layer and, thereby, oxidation at the pore edges in the molded ceramic member. In essence, this approach takes the pores and seals them with respect to the exterior by means of a durable glass layer or coating. In contrast therewith, the present invention has as its precise purpose to avoid the pores by means of compression, initially requiring their evacuation, rendered possible through the intermediary of a temporarily applied glass layer; and wherein the invention also concerns itself with a suitable, while concurrently effected, formation and evacuation of the glass envelope.

DETAILED DISCUSSION OF THE INVENTION

Described hereinbelow are two preferred approaches, having been found to be valuable approaches in experimentation. When reaction-sintered silicon nitride is specified, the assumption is that the numerously mentioned experimentations are carried out with silicon nitride. However, it may be assumed that other types of ceramic materials, when not a poor ceramic, will correspondingly perform, so that silicon nitride ($Si_3N_4$) or the similarly investigated silicon carbide (SiC) should be merely considered as safe forms of equivalent ceramics.

Approach 1: (two-step heat treatment process)

Initially produced was a porous molded member of reaction-sintered silicon nitride. Vapor deposited thereon was metallic aluminum. In a first heat treatment step (annealing in air for about 12 hours at about 580° C.) the aluminum was converted into aluminum oxide. Concurrently, silicon oxide is formed on the surface of the molded member. In a second heat treatment step (at about 1200° C. for about 0.5 hour under a vacuum) silicon oxide and aluminum oxide formed a high temperature-resistant glass layer on the surface of the porous silicon nitride member. After the heat treatment, the vacuum remained intact interiorly of the pressing as a result of the glass layer.

Approach 2: (single-step heat treatment process)

Initially again produced was a porous molded member of reaction-sintered silicon nitride. Deposited on the surface thereof were the constituents of a high temperature-resistant glass such as, for example, oxides of the rare earths and silicon oxide, in the finest possible distribution. In a heat treatment operation at about 1200° C. under a vacuum, the oxides were converted into a high temperature-resistant glass which covered the entire surface of the molded member and thus maintained intact the vacuum in the interior of the pressing.

Resulting from both approaches is a pressing or briquette with an envelope of a high temperature-resistant glass which can be further processed through high-temperature isostatic pressing into a dense molded member. During the compression of the molded member, the glass envelope will soften to such an extent that it no longer hinders the volumetric reduction, however, without allowing for the entry of gas into the evacuated envelope.

What is claimed is:

1. In a method for the manufacturing of a molded member comprising a silicon nitride material, including compressing said molded silicon nitride member within an evacuated capsule of a high temperature-resistant glass under a pressure acting thereabout until said molded member attains a non-porous condition, the improvement comprising: applying the working materials forming said glass capsule to said molded member in a non-vitrified state; and subjecting said coated member to the reaction temperature of said materials under a vacuum until there is formed a cohesive glass layer enveloping said molded member and constituting the capsule.

2. Method as claimed in claim 1, said molded member being a porous member of reaction-sintered silicon nitride, comprising vapor-depositing metallic aluminum on said molded member, exposing said molded member in a first heat treatment step to a relatively low temperature under atmospheric pressure for a relatively lengthy period of time; and thereafter in a second heat treatment step to a relatively high temperature under a vacuum for a relatively short period of time, whereby the time period and temperature in said first heat treatment step cause the metallic aluminum to be converted into aluminum oxide and in the second heat treatment operation cause the silicon oxide and aluminum oxide to be converted into high temperature-resistant glass.

3. Method as claimed in claim 2, wherein said first heat treatment step has a time period of about 2 to 12 hours, and a treatment temperature of about 200° to 580° C., and said second heat treatment step has a time period of about 5 minutes to 5 hours and a treatment temperature of about 800° to 1500° C.

4. Method as claimed in claim 2, wherein in said first heat treatment step the time period of said heat treatment is about 12 hours and the treatment temperature about 580° C., and in said second heat treatment step the time period is about 0.5 hour and a temperature of about 1200° C.

5. Method as claimed in claim 1, comprising depositing the constituents of a high temperature-resistant glass in a finely divided state on said porous molded member of a reaction-sintered silicon nitride; and thereafter subjecting said molded member under a vacuum to a heat treatment at a temperature which is the temperature for converting the constituents of the coating layer into glass for a time period affording the conversion of the constituents of the coating layer into glass.

6. Method as claimed in claim 5, wherein said constituents of the coating layer are oxides of rare earths and silicon oxide, and wherein said conversion temperature is about 1200° C. and the treatment time of up to a few hours.

7. Method as claimed in claim 5, wherein said constituents of the coating layer are oxides of the elements of the first to fourth groups of the periodic system and silicon oxide.

* * * * *